United States Patent [19]

Cespon

[11] 4,348,234

[45] Sep. 7, 1982

[54] COATING COMPOSITIONS FOR THE PRODUCTION OF A RECORDING MATERIAL

[75] Inventor: Manuel Cespon, Vienna, Austria

[73] Assignee: Ciba-Geigy Corporation, Ardsley, N.Y.

[21] Appl. No.: 130,304

[22] Filed: Mar. 14, 1980

[30] Foreign Application Priority Data

Mar. 20, 1979 [AT] Austria .............................. 2073/79

[51] Int. Cl.[3] .............................. C09D 11/00

[52] U.S. Cl. .............................. 106/21; 106/31; 282/27.5; 427/145; 427/150; 427/151

[58] Field of Search .............................. 106/21, 31; 282/27.5; 427/145, 150, 151

[56] References Cited

U.S. PATENT DOCUMENTS

| | | | |
|---|---|---|---|
| 2,505,470 | 4/1950 | Green | 117/36 |
| 2,505,471 | 4/1950 | Green | 117/36 |
| 2,505,472 | 4/1950 | Green | 117/36 |
| 2,505,473 | 4/1950 | Green | 117/36 |
| 2,505,474 | 4/1950 | Green | 117/36 |
| 2,505,475 | 4/1950 | Green | 117/36 |
| 2,505,476 | 4/1950 | Green | 117/36 |
| 2,505,477 | 4/1950 | Green | 117/36 |
| 2,505,478 | 4/1950 | Green | 117/36 |
| 2,505,479 | 4/1950 | Green | 117/36 |
| 2,505,480 | 4/1950 | Green | 117/36 |
| 2,505,481 | 4/1950 | Green | 117/36 |
| 2,505,482 | 4/1950 | Green | 117/36 |
| 2,505,483 | 4/1950 | Green | 117/36 |
| 2,505,484 | 4/1950 | Green | 117/36 |
| 2,505,485 | 4/1950 | Green | 117/36 |
| 2,505,486 | 4/1950 | Green | 117/36 |
| 2,505,487 | 4/1950 | Green | 117/36 |
| 2,505,488 | 4/1950 | Green | 117/36 |
| 2,505,489 | 4/1950 | Green | 117/36 |
| 3,516,845 | 6/1970 | Brockett | 117/36.2 |
| 3,632,364 | 1/1972 | Green | 117/36 |
| 3,732,120 | 5/1973 | Brockett et al. | 117/16 |
| 3,834,929 | 9/1974 | Hayashi et al. | 117/36.2 |
| 3,843,384 | 10/1974 | Adachi et al. | 282/27.5 |
| 3,894,168 | 7/1975 | Brockett et al. | 428/307 |
| 4,096,314 | 6/1978 | Cespon | 428/307 |
| 4,183,553 | 1/1980 | Petitpierre | 106/21 |

FOREIGN PATENT DOCUMENTS

| | | |
|---|---|---|
| 329595 | 5/1976 | Austria . |
| 329596 | 5/1976 | Austria . |
| 329597 | 5/1976 | Austria . |
| 1807894 | 8/1970 | Fed. Rep. of Germany . |
| 2163905 | 12/1971 | Fed. Rep. of Germany . |
| 2303405 | 8/1973 | Fed. Rep. of Germany . |
| 1253056 | 11/1971 | United Kingdom . |
| 1426641 | 3/1976 | United Kingdom . |
| 1429069 | 3/1976 | United Kingdom . |
| 1472580 | 5/1977 | United Kingdom . |
| 1526144 | 9/1978 | United Kingdom . |

*Primary Examiner*—John Kight, III
*Assistant Examiner*—Amelia B. Yarbrough
*Attorney, Agent, or Firm*—Edward McC. Roberts

[57] ABSTRACT

Coating compositions for the production of a pressure-sensitive recording material based on a color former composition and a color developer composition. The color developer composition contains, as developer, at least two water-soluble inorganic metal salts, at least one of which is a nitrate, and is preferably in the form of a wax emulsion. Preferred color developers are mixtures of halides and nitrates.

12 Claims, No Drawings

COATING COMPOSITIONS FOR THE PRODUCTION OF A RECORDING MATERIAL

The present invention relates to coating compositions for the production of a pressure-sensitive recording material and the recording material obtained therewith which contains all the necessary constituents for producing a coloured marking when pressure is exerted.

Known coating compositions for pressure-sensitive copying systems usually contain a solution of colour formers encapsulated in microcapsules and an acid component which reacts with the colour formers under pressure, such as activated clays, e.g. attapulgite, bentonite, halloysite, zeolith, montmorillonite, kaolin, zinc oxide and phenol compounds, phenol resins or solid organic acids. These colour developing or electron acceptor components can also be employed in combination with an inorganic or organic metal salt.

When pressure is exerted, e.g. by writing, the microcapsules are ruptured, whereupon the colour former solution comes into contact with the acid acceptor component and the desired coloured marking develops.

It was already known from Austrian patent specification No. 284 880 or British patent specification No. 1 215 618 to use such coating compositions in which the colour formers are encapsulated in dissolved form and the acid colour developing component consists of a mixture of an oil-soluble phenolic polymer, acidic kaolin and an inorganic metal salt, such as zinc chloride. Colour formers and colour developers are present in two layers which are in direct contact with each other. The capsules are ruptured by pressure and a coloured area is formed after the colour former comes into contact with the mixture which undergoes acid reaction.

Austrian patent No. 268 331 or British patent No. 1 071 724 postulates the addition of an inorganic metal salt to an attapulgite-containing coating composition in order to increase the reactivity, whereby the active surface of the attapulgite is protected from impurities and, when contact is made with the colour former, accordingly a marked improvement in the resulting colouration is obtained.

It is also known to use an inorganic metal salt, especially zinc chloride, as catalyst or activator, said metal salt being used in combination with an acid clay, an organic acid or a phenolic compound. This use of a metal salt is described e.g. in German Offenlegungsschriften Nos. 1 807 894, 2 303 405 and 2 163 905.

Austrian patents Nos. 329 595, 329 596 and 329 597 describe a copying material whose acid colour developing component consists of a chloride of a metal having an atomic weight of 50 to 66, preferably zinc chloride. This metal chloride can also be used in combination with urea, thiourea or diphenyl thiourea. The concurrent use of a solvent is dispensed with in such copying materials.

It is the object of the present invention to provide coating compositions for recording materials which produce strong and light-resistant coloured markings without the use of microcapsules. This object is attained by incorporating a mixture of water-soluble inorganic metal salts in the colour developing acceptor material, at least one of said metal salts being a nitrate.

The nitrate promotes and stabilises the colour formation of the other more rapidly reacting metal salt by means of a slow reaction and thereby improves the intensity and light resistance of the resultant colourations.

Accordingly, the present invention provides coating compositions for the production of a pressure-sensitive recording material based on a colour former composition and a colour developer composition, wherein said colour developer composition contains, as developer, at least two water-soluble inorganic metal salts, at least one of which is a nitrate. If desired, the colour developer can additionally contain maleic acid or derivatives thereof which improve the water-resistance of the copies.

The metal salt mixtures employed in the practice of this invention are advantageously derived from polyvalent metals having an atomic weight of 24 to 210, preferably 40 to 120 and especially 50 to 120. Examples of such metals are aluminium, barium, lead, cadmium, calcium, chromium, iron, gallium, cobalt, copper, magnesium, manganese, molybdenum, nickel, mercury, silver, strontium, tantalium, titanium, vanadium, tungsten, zinc, tin and zirconium. Preferred metals are tin, zinc, manganese, iron, nickel and cobalt.

Especially preferred mixtures of metal salts contain at least one halide and at least one nitrate. The ratio of metal halide to nitrate is preferably 1:9 to 9:1. Both the halide and the nitrate can be used individually or as mixtures. A suitable halide can be a fluoride, iodide, bromide or, preferably, chloride.

The metal halides advantageously have a molecular weight of 120 to 280, whilst the nitrates (in the form of their anhydrides) preferably have molecular weights from 150 to 350.

Examples of metal halides are nickel (II) chloride, nickel(II) bromide, cobalt(II) chloride, iron(II) chloride, copper chloride, zinc chloride, tin bromide, tin chloride, manganese(II) chloride, calcium fluoride, cadmium iodide, or mixtures thereof. Zinc chloride and tin chloride are especially preferred.

Examples of nitrate are iron nitrate, nickel nitrate, manganese nitrate, zinc nitrate or mixtures thereof.

Excellent results are obtained especially by a combination of two or three halides and nitrates of tin, zinc, manganese, iron, nickel and/or cobalt. These combinations can advantageously also contain maleic acid.

The use of such combinations produces more reactive and light-resistant recording materials which, owing to the addition of the slow reacting nitrate, also make possible a complete and stable colour formation and, in addition, afford permanent water- and lightfast coloured markings.

It is advantageous to apply the colour developer composition to the support in an amount of 1 to 6 g/m$^2$. The amount of inorganic metal salt mixture in this composition is advantageously in the range from 5 to 80% by weight, with the preferred range being from 10 to 80% by weight.

The colour formers suitable for use in the colour former composition are known colourless or faintly coloured substances which, on coming into contact with the colour developers, become coloured or change colour. It is possible to use colour formers or mixtures thereof which belong e.g. to the classes of the phthalides, fluoranes, spiropyranes, azomethines, triarylmethane-leuco dyes, leuco auramines, substituted phenoxazines or phenothiazines, and of the chromeno or chromane colour formers. Examples of such suitable colour formers are: crystal violet lactone, 3,3-(bisaminophenyl)-phthalides, 3,3-(bis-substituted indolyl)-phthalides, 3-(aminophenyl)-3-indolyl-phthalides, 6-dialkylamino-2-n-octylamino-fluoranes, 6-dialkylamino-2-arylamino-fluoranes, 6-dialkylamino-3-methyl-2-arylamino-fluoranes, 6-dialkylamino-2- or 3-lower alkyl-fluoranes, 6-dialkylamino-2-dibenzylamino-fluoranes, bis-(aminophenyl)-furyl-, -phenyl- or -carbazolylmethanes or benzoyl leucomethylene blue.

The amount of colour former in the solids content of the coating compositions is 1 to 20% by weight, preferably 2 to 15% by weight.

Both the colour former composition and the colour developer composition are preferably secured to the support by means of a suitable binder.

As paper is the preferred support, the binder is chiefly a paper coating compound, such as gum arabic, polyvinyl alcohol, polyvinyl pyrrolidone, polyvinyl acetate, vinyl acetate copolymer, hydroxyethyl cellulose, casein, protein, sodium alginate, methyl cellulose, carboxymethyl cellulose, dextrin, starch or modified starches, e.g. oxidised, hydrolysed or hydroxyethylated starch, or polymer latices. Examples of these latter are polystyrene, butadiene-styrene copolymers or acrylic homo- or copolymers, e.g. of acrylic acid or methacrylic acid or lower alkyl esters thereof, e.g. of ethyl acrylate, butyl acrylate or methyl methacrylate, and also of acrylamide. The amount of binder in the coating composition is usually 5 to 45% by weight, preferably 6 to 25% by weight, based on the solids content.

The paper employed as support comprises not only normal paper made of cellulose fibers, but also paper in which the cellulose fibers are partially or completely replaced by fibers made from synthetic polymers.

To facilitate printing, the coating compositions containing the colour developers and colour formers can additionally contain solid pigments or fillers. As such solids it is possible to use inorganic pigments, e.g. talcum, titanium dioxide, alumina derivatives, barium sulfate, calcium sulfate, calcium sulfoaluminate, zinc oxide, silica, calcium carbonate, inert clays and/or kaolins, especially spreading kaolin, as well as organic pigments, e.g. urea-formaldehyde or melamineformaldehyde condensation products.

In addition to the substances mentioned above, the coating compositions can contain further assistants, e.g. emulsifiers of the anionic, cationic or non-ionic type, dispersants, plasticisers, UV absorbers, antifoams and/or fungicides.

It has also been observed that the further addition of metal stearates which preferably have a melting point of 90° to 150° C., as well as nonylphenols, derivatives of triethanolamine or propionic acid and/or colophonium resins, yield especially stable coating compositions with improved properties. Examples of metal stearates are: lead, calcium, cadmium, aluminium, barium, iron, magnesium, cobalt, tin and zinc stearate. Suitable derivatives of propionic acid and triethanolamine are in particular: octadecyl 3-(3,5-di-tert-butyl-4-hydroxyphenyl)-propionate and stearyl thiodipropionate and triethanolaminoleate.

Both the colour former composition and the colour developer composition can be applied to the support with the aid of solvents or preferably in the form of a wax emulsion and/or melt. Coating is usually effected in the temperature range from 20° to 180° C., preferably 60° to 160° C.

In solvent coating it is possible to use water or organic solvents, such as aliphatic or aromatic unsubstituted or chlorinated hydrocarbons, alcohols, esters, ketones or glycol ethers. Examples of suitable organic solvents include methanol, ethanol, isopropanol, butanol, acetone, ethyl acetate, butyl acetate, benzene, toluene, xylene, methyl chloride or mixtures thereof.

If a melt is employed, the inorganic metal salts or the colour formers are dissolved or dispersed in a solvent, preferably water, whereupon a wax is emulsified in this solution or dispersion, and the support is coated with the resultant wax emulsion, advantageously at a temperature in the range from 50° to 180° C., preferably from 60° to 160° C.

Suitable waxes can be both neutral waxes, e.g. vegetable, animal or mineral waxes, and synthetic waxes. Preferred waxes are chlorinated waxes, paraffins, oxide waxes, and especially polyethylene or polyethylene oxide waxes having a molecular weight of 400 to 12000. Examples of suitable waxes are carnauba wax, amide wax, hard wax, microwax, polyethylene wax or ozocerite. These waxes can also be used as mixtures. The amount of wax contained in the coating compositions, especially in the colour developer composition, is usually 5 to 85% by weight, preferably 15 to 75 by weight, based on the solids content.

The pressure-sensitive recording material of this invention consists preferably of a support sheet with a layer containing a colour former and a layer containing the colour developer. However, colour former and colour developer can also be present together on a support. The recording material is mainly solvent-containing and can contain up to 90% by weight of the solvent employed for the application. The results of the comparison tests demonstrating the advance attained according to the invention are reported in the subsequent table.

The test material is a colour former composition prepared from 10% of crystal violet lactone, 5% of vinyl acetate copolymer, 30% of filler and 55% of acetone. A paper support (40 g/m² basis weight) is coated with this composition. The coating thickness is 1 g/m². The colour developer compositions contain, as developer, the reagents listed in the second column of the table. The solvent employed for the coating is acetone. The colour developer composition is brought into contact with a glass rod with the colour former composition coated on the paper.

TABLE

| Test | Reagent | Reactivity | Lightfastnest | Water resistance |
|---|---|---|---|---|
| 1 | attapulgite | weak | poor | poor |
| 2 | iron nitrate | very strong | poor | poor |
| 3 | manganese nitrate | weak | good | poor |
| 4 | zinc chloride | good | poor | poor |
| 5 | zinc nitrate | good | good | poor |
| 6 | maleic acid | weak | good | poor |
| 7 | iron nitrate + manganese chloride | very strong | good | poor |
| 8 | tin chloride + zinc nitrate | very strong | good | good |
| 9 | zinc chloride + manganese nitrate | very strong | good | poor |
| 10 | zinc chloride + zinc nitrate + tin chloride | very strong | good | good |
| 11 | zinc chloride + manganese nitrate + maleic acid | very strong | good | good |

It can be observed from this table that, compared with the individual components, the use of two or more inorganic metals salts, optionally also in combination with maleic acid (tests 7 to 11), effects a marked improvement in the general properties of coating compositions and recording materials, namely reactivity, lightfastness and water resistance. These results can be further improved by the additional use of metal stearates, resins, nonyl phenol, ureas, propionic acid derivatives or organic triethanolamine salts in the colour developer composition.

In the following examples of coating compositions, parts and percentages are by weight unless otherwise stated. In coating compositions which are applied to the support with the aid of a solvent, the respective solvent is also mentioned.

EXAMPLES OF A COLOUR FORMER COMPOSITION

| | | |
|---|---|---|
| (1) | vinyl acetate | 10 parts |
| | kaolin | 50 parts |
| | nonyl phenol | 2 parts |
| | crystal violet lactone | 5 parts |
| | benzoyl-leuco methylene blue | 2 parts |
| | acetone | 80 parts |
| | coating thickness 1.2 $g/m^2$ | |
| (2) | polystyrene | 7 parts |
| | calcium carbonate | 60 parts |
| | zinc oxide | 10 parts |
| | triethanolaminoleate | 3 parts |
| | crystal violet lactone | 8 parts |
| | benzoyl-leuco methylene blue | 4 parts |
| | toluene | 110 parts |
| | coating thickness 1.9 $g/m^2$ | |
| (3) | polyvinyl alcohol | 12 parts |
| | calcium carbonate | 50 parts |
| | urea-formaldehyde condensation product | 5 parts |
| | crystal violet lactone | 7 parts |
| | benzoyl-leuco methylene blue | 3 parts |
| | water | 140 parts |
| | coating thickness 2.7 $g/m^2$ | |

EXAMPLES OF A COLOUR DEVELOPER COMPOSITION

| | | |
|---|---|---|
| (1) | zinc nitrate | 20 parts |
| | iron chloride | 10 parts |
| | kaolin | 40 parts |
| | polyethylene wax | 10 parts |
| | vinyl chloride acetate | 12 parts |
| | nonyl phenol | 2 parts |
| | ozocerite | 40 parts |
| | ethanol | 20 parts |
| | toluene | 80 parts |
| | coating thickness 4.5 $g/m^2$ | |
| | coating temperature 25° C. | |
| (2) | manganese nitrate | 10 parts |
| | zinc chloride | 10 parts |
| | zinc nitrate | 15 parts |
| | polyvinyl alcohol | 14 parts |
| | aluminium stearate | 5 parts |
| | polyethylene wax | 20 parts |
| | paraffin wax | 50 parts |
| | water | 130 parts |
| | coating thickness 3.9 $g/m^2$ | |
| | coating temperature 60° C. | |
| (3) | nickel(II) bromide | 20 parts |
| | zinc nitrate | 10 parts |
| | maleic acid | 10 parts |
| | lead stearate | 5 parts |
| | polyethylene wax | 12 parts |
| | hard wax | 50 parts |
| | isopropyl alcohol | 30 parts |
| | coating thickness 3.9 $g/m^2$ | |
| | coating temperature 90° C. | |
| (4) | tin bromide | 10 parts |
| | manganese nitrate | 10 parts |

-continued

| | | |
|---|---|---|
| | zinc nitrate | 15 parts |
| | zinc stearate | 5 parts |
| | colophonium resin | 6 parts |
| | oxide wax | 10 parts |
| | polyethylene wax | 5 parts |
| | paraffin wax | 55 parts |
| | ethanol | 25 parts |
| | coating thickness 3.2 $g/m^2$ | |
| | coating temperature 80° C. | |
| (5) | synthetic wax containing 20% of isoparaffin and having a melting point of 65° C. | 50 parts |
| | pentaerythrityl-tetrakis 3-(3,5-di-tert-butyl-4-hydroxyphenyl)propionate | 3 parts |
| | nonyl phenol | 5 parts |
| | aluminium stearate | 8 parts |
| | tin chloride | 10 parts |
| | manganese nitrate | 5 parts |
| | water | 20 parts |
| | coating thickness 4.8 $g/m^2$ | |
| | coating temperature 100° C. | |
| (6) | synthetic wax containing 10% of isoparaffin and having a melting point of 78° C. | 60 parts |
| | polyethylene wax | 10 parts |
| | octadecyl 3-(3,5-di-tert-butyl-4-hydroxyphenyl)propionate | 2 parts |
| | triethanolaminoleate | 4 parts |
| | tin chloride | 10 parts |
| | zinc nitrate | 15 parts |
| | water | 20 parts |
| | coating thickness 3 $g/m^2$ | |
| | coating temperature 120° C. | |
| (7) | synthetic wax containing 10% of isoparaffin and 15% of polyethylene | 75 parts |
| | zinc chloride | 10 parts |
| | iron nitrate | 15 parts |
| | manganese nitrate | 5 parts |
| | maleic acid | 10 parts |
| | distearyl thiodipropionate | 4 parts |
| | water | 25 parts |
| | coating thickness 2.6 $g/m^2$ | |
| | coating temperature 105° C. | |
| (8) | paraffin wax (m.p. 55°-60° C.) | 40 parts |
| | microwax | 15 parts |
| | polyethylene wax | 10 parts |
| | zinc chloride | 10 parts |
| | zinc nitrate | 20 parts |
| | zinc stearate | 10 parts |
| | nonyl phenol | 3 parts |
| | water | 25 parts |
| | coating thickness 3.1 $g/m^2$ | |
| | coating temperature 100° C. | |

What is claimed is:

1. A coating composition for the production of a pressure-sensitive recording material based on a color former composition and a color developer composition, said color developer composition containing, a color developer consisting essentially of a mixture of at least two water-soluble inorganic metal salts, including at least one nitrate with a molecular weight of 150 to 350 and at least one halide with a molecular weight of 120 to 280.

2. A coating composition according to claim 1, wherein the metal salts are derived from polyvalent metals having an atomic weight of 24 to 210.

3. A coating composition according to claim 1, wherein the metal salts are derived from polyvalent metals having an atomic weight of 40 to 120.

4. A coating composition according to claim 1, wherein the colour developer composition contains a binary or ternary mixture of halides and nitrates of a metal selected from the group consisting of tin, zinc, manganese, iron, cobalt, and nickel.

5. A coating composition according to claim 1, wherein the nitrate is in the form of the nitrate of zinc, nickel, manganese or iron, or of a mixture thereof.

6. A coating composition according to claim 1, wherein the developer composition additionally contains maleic acid.

7. A coating composition according to claim 1, wherein the content of metal salt is 10 to 80% by weight, based on the solids content of the colour developer composition.

8. A coating composition according to claim 1, wherein the colour developer composition consists of a wax emulsion.

9. A coating composition according to claim 8, wherein the wax content of the colour developer composition is 5 to 85% by weight, based on the solids content of the developer composition.

10. A coating composition according to claim 1, wherein the colour developer composition contains a solvent in which the reagents have a solubility of 5 to 100%.

11. A coating composition according to claim 1, wherein the colour developer composition contains a binary or ternary mixture of halides and nitrates of at least one metal selected from the group consisting of aluminum, barium, lead, cadmium, calcium, chromium, iron, gallium, cobalt, copper, magnesium, manganese, molybdenum, nickel, mercury, silver, strontium, tantalum, titanium, vanadium, tungsten, zinc, tin and zirconium.

12. A coating composition according to claim 1, wherein the ratio of metal halide to nitrate is between about 1:9 to 9:1.

* * * * *